3,792,031
PROCESS FOR IMPROVED ELASTOMERS
Anne C. Udding, Amsterdam, Netherlands, assignor to
Shell Oil Company, New York, N.Y.
No Drawing. Filed Feb. 22, 1972, Ser. No. 228,231
Claims priority, application Netherlands, June 23, 1971,
7108691
Int. Cl. C08d 5/02
U.S. Cl. 260—94.7 N                    8 Claims

ABSTRACT OF THE DISCLOSURE

A process for the modification of elastomeric isoprene polymers into products which can be processed together with a filler to unvulcanized compositions having improved "green strength" comprises reacting such an isoprene polymer with from about 0.01 to about 5% by weight of a mononitrone at a temperature from about 60° C. to about 200° C.

This invention is concerned with a process for preparing isoprene polymer compositions which in the unvulcanized state display improved mechanical properties.

BACKGROUND OF THE INVENTION

Isoprene polymers such as polyisoprene prepared with the aid of lithium hydrocarbyl initiator possesses many desirable elastomeric properties; however, these polymers have been precluded from many commercial applications owing to deficient mechanical properties in the unvulcanized state, i.e., they have inadequate "green strength." Green strength, as may be measured by conventional tensile tests, relates to the suitability of the polymer for conventional rubber processing such as milling and subsequent handling and building operations. Generally speaking, elastomers such as polybutadiene rubber inherently possess adequate green strength without modification.

It is known from Tada et al, J. of Applied Pol. Sci. 15, 117–128 (1971) to apply mononitrones which have been formed in situ and contain no substituents other than a phenyl group and/or a pyridyl group and/or an ethyl group, for the modification of butadiene rubber with a relatively low average molecular weight so as to improve the stress-strain characteristics of the filler-containing vulcanizates obtained from them. The quantities of nitrone applied for this purpose are, however, considerably larger than those used according to the present process. Reaction products of diene polymers and such large quantities of nitrone are difficult to process, especially if diene polymers, particularly isoprene polymers, with higher average molecular weights are used as starting materials.

It is also known from British Pat. 1,146,469 to apply certain polyfunctional nitrones to ethylenically unsaturated polymers resulting in tough, hard cross-linked products substantially insoluble in hydrocarbon solvents.

STATEMENT OF THE INVENTION

It has now been found that isoprene polymers can be modified into products which can be processed, together with a filler, to compositions which, in the unvulcanized state display improved mechanical properties, by a process which comprises reacting said isoprene polymer with from about 0.01 to about 5% by weight on polymer of a mononitrone at a temperature in the range from about 60 to about 200° C. Further, if the mononitrones contain hydrocarbyl groups bearing certain polar substituents, the reaction products can be converted into thermoplastic products by reaction with, for example, metal oxides, metal hydroxides or metal salts.

DESCRIPTION OF THE PREFERRED EMBODIMENT

The process for preparing isoprene elastomers having improved green strength is broadly applicable to homopolymers of isoprene and copolymers of isoprene with a minor amount, e.g., up to 20, preferably up to 10% of an anionically copolymerizable monomer such as, for example styrene. The process is of especial importance for isoprene polymers which have been prepared with the aid of a lithium hydrocarbyl compound, e.g., a lithium alkyl compound and preferably a lower alkyl compound such as butyl lithium as initiator. The process is suitably employed for modifying polyisoprene having a cis 1,4 content from about 70 to about 98% by weight, as may be determined by conventional nuclear magnetic resonance technique. The process is particularly aimed at the modification of isoprene polymers whose intrinsic viscosities measured in toluene at 25° C. are at least 3 dl./g.

In the modification process the reaction of the polymer with the nitrone proceeds via the unsaturated C—C bonds in the polymer. If the C—C bonds are double bonds, they are replaced by single bonds with the formation of isoxazolidine ring structures.

The modification can readily be effected without giving rise to the formation of highly discolored products, if the polymers to be modified are caused to react with at least 0.01 and at most 5% w. of a mononitrone. The nitrones which may be applied according to the invention corresponding to the general formula:

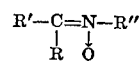

in which R represents a hydrogen atom or an organic group, and R' and R" represent organic groups which may be the same or different. Each of the organic groups R, R' and R" may contain up to 18 carbon atoms and preferably 2–10 carbon atoms and may contain one or more non-hydrocarbyl substituents, i.e., substituents containing atoms of elements other than carbon and hydrogen. Further, R' and R" may be linked together to form a non-aromatic cyclic system in which the group

constitutes a part of the ring of that system.

Dependent on the particular application of the reaction products, preference is given to the use of nitrones with at least one organic group R, R' or R" having a substituent other than a hydrocarbyl group, i.e., a substituent containing atoms of elements other than carbon and hydrogen. Preference is also given to organic groups with an aromatic character. The term "groups with an aromatic character" or "aromatic groups" includes a phenyl, a thienyl, a pyridyl and a furyl group, for example, the α-furyl-N-phenylnitrones, the α-thienyl-N-phenylnitrones, the α-pyridyl-N-phenylnitrones and the like. These groups, too, may have one or more substituents other than a hydrocarbyl group.

As examples of the above-mentioned substituents which are not hydrocarbyl groups, particularly eligible are groups having an oxygen atom that is linked via a double bond to another atom, such as for example, carbon, sulfur, phosphorus or nitrogen. Examples of such groups include: a carboxyl, sulpho, sulphino, phosphono, nitroso, sulphamoyl, formyl, acetyl, or higher acyl group. Of these groups the carboxyl groups are preferred.

Exemplary nitrones include

α-(2-carboxy)-phenyl-N-phenylnitrone;
α-phenyl-N-(4-sulpho)-phenylnitrone;
α-(4-phosphono)-phenyl-N-phenylnitrone;
α-(4-sulphamoyl)-phenyl-N-phenylnitrone;
α-(4-formyl)-phenyl-N-phenylnitrone;
α-(4-acetyl)-phenyl-N-phenylnitrone and the like.

The organic groups most preferred are hydrocarbyl groups with at least one substituent that is not of the hydrocarbyl type; in this case, too, preference is given to the presence of at least one carboxyl group. A particularly eligible organic group is a phenyl group with at least one carboxyl group as substituent.

Suitable nitrones include, for example α(2-carboxy)-phenyl-N-phenylnitrone; α(4-carboxy)-phenyl-N-phenylnitrone; α-phenyl-N-(4-carboxy)-phenylnitrone and the like.

The organic groups which are capable or assuming an enolic structure, and aromatic groups with a hydroxyl group attached to the nucleus are also of particular importance. Nitrones with organic groups containing a carbon bonded to an $NH_2$, $NHR'''$ or $NR_2'''$ group ($R'''=$ hydrocarbyl up to 6 carbon atoms), a SH group or an alcoholic OH group or a halogen atom as substituent, may also be applied. Among the halogens chlorine and bromine are preferred. Finally, the organic groups may also contain a —C(O)OM, —OM, or OR''' group as substituent, M representing any metal such as, e.g., potassium, zinc or aluminum, and R''' represents a hydrocarbyl group of up to 6 carbon atoms. Examples include α(methylamino)-phenyl-N-phenylnitrone;
α(4-mercapto)-phenyl-N-phenylnitrone;
α(4-hydroxy)-phenyl-N-phenylnitrone;
α(3-chloro)-phenyl-N-phenylnitrone;
α(4-zincoxycarbonyl)-phenyl-N-phenylnitrone;
α(2 lead oxycarbonyl)-phenyl-N-phenylnitrone; and
α(2-methoxy)-phenyl-N-phenylnitrone.

The nitrones which may be applied according to the invention also include representatives in which two or more dissimilar organic groups of the types mentioned are present. For example α(4-chloro-5-hydroxy)-phenyl-N-phenylnitrone and α(3-chloro)-phenyl-N-(4-carboxy)-phenylnitrone.

In general, preference is given to those nitrones which contain at least two groups with an aromatic character, one of which is bound to the nitrogen atom of the =C=N(O) group, the other to the carbon atom of the same group.

Among the nitrones most preference is given to aldonitrones, hence, the nitrones of the above-mentioned formula in which R' and R" still have their original meaning but in which R exclusively stands for hydrogen, which nitrones originate, or may be thought to originate, from an aldehyde and a hydroxylamine derivative.

The quantity of nitrone applied is in the range from about 0.1 to about 5% by weight and preferably not more than 1.5% w., calculated on polymer; most preference is given to quantities of 0.1–1.0% w. of the quantity of polymer.

A simple embodiment of the process according to the invention is that in which the nitrone envisaged is prepared in situ, preferably from the corresponding hydroxylamine derivative and the corresponding aldehyde or ketone. For this purpose these reaction components may be mixed with the polymer in advance by adding them to the polymer, either simultaneously or consecutively, after which they are allowed to react with each other and with the polymer. The mixing temperature may be chosen such that the nitrone is formed during mixing. It is also possible to effect mixing at a temperature lower or higher than that at which the formation of nitrone starts. The reaction of the nitrone with the polymer can be effected at a temperature that is higher than the temperature at which the nitrone is formed. A disadvantage of the in-situ preparations is that the color of the reaction products is somewhat more pronounced, probably owing to part of the hydroxylamine derivative not being converted into nitrone. In addition, the strength of the unvulcanized compositions of the reaction product may be somewhat lower than when the reaction is performed with a nitrone that has been prepared in advance, in the absence of the polymer.

Of course, if the nitrones are added as such to the polymer, the mixing temperature may also be lower than, equal to, or higher than the temperature at which the reaction with the polymer is effected.

Further, it is desirable that the nitrone should have a melting point that is lower than the temperature at which the reaction with the polymer is effected, preferably, a melting point below 160° C. The preferred reaction temperature is below 200° C. and above 60° C., preferably below 170° C. The use of a lower reaction temperature generally diminishes the degree of polymer breakdown, if any, resulting in a less sticky reaction product having better cold flow.

The reaction according to the invention may be effected in solution, or without application of a solvent, whether or not the reaction takes place in situ. The reaction can be performed under "dry," i.e., solvent-free conditions, for instance, in an internal mixer, a continuously operating extrusion apparatus or a mill. If solvents are applied, the reaction with the polymer may, if desired, be caused to proceed during the removal of the solvent, or in a later stage, for example, if the solvent has been removed with the aid of steam, when the polymer is being dried. The in-situ formation of the nitrone may also be postponed until this drying step, if desired. Reaction times from about 2 to about 300 minutes, preferably from about 5 to about 30 minutes may be employed.

Various conventional fillers such as reinforcing fillers, for example carbon blacks such as HAF (high abrasion furnace carbon black), ISAF (intermediate super abrasion furnace carbon black), silicas and silicates; or non-reinforcing fillers such as whiting, and extender oils may be incorporated into the mixture.

For the improvement of the mechanical properties of an unvulcanized composition of the polymer with the aid of fillers, either in the presence or in the absence of vulcanizing agents, as a rule not more than about 1% w. of nitrone, calculated on polymer, is applied. If the nitrone used contains one or more organic groups in which at least one substituent is present which is not a hydrocarbyl group, for instance, a carboxyl group, a sulpho group or a phosphono group, and if this nitrone is applied in quantities between 0.5 and 10% w., calculated on the polymer, the reaction products thus obtained may be further reacted with from about 0.1 to about 10 moles, preferably from about 0.5 to about 5 moles (m.) on the amount of nitrone applied in the modification step of at least one agent selected from metal oxides, metal hydroxides and certain fatty acid salts, in the absence of sulphur, and if desired, in the presence of fillers, to give ionomers having a thermoplastic character. In those cases, the quantity of nitrone applied is preferably from 1 to 5% w., calculated on polymer. Suitable metals are the divalent metals of Groups IIa and b and IVa and b of the Periodic System. The Periodic System herein refers to the Periodic Table of Elements, "Handbook of Chemistry and Physics," Chemical Rubber Co., 50th ed. (1969), page B–3. Suitably, the metal salts are of fatty acids containing 1 to 20 carbon atoms provided that the acidity of the acid group of said fatty acid is weaker than the acid group of the nitrone. Preferably, the metal salts are of fatty acids containing from 12 to 18 carbon atoms. Exemplary agents include oxides and hydroxides of magnesium, calcium, barium, cadmium, titanium, tin and lead, and metal salts such as lead carbonate, zinc acetate, calcium oxalate, zinc stearate, zinc oleate, magnesium oleate and lead oleate. Most preferred are zinc and lead salts of saturated and unsaturated fatty acids containing 10 to 20 carbon atoms.

Another aspect of the invention is based on the fact that certain nitrones may also serve as an antioxidant. This applies for, among other compounds, the nitrones of the formula mentioned hereinbefore, in which one or more of the symbols R, R' and R" represent(s) a hydroxyphenyl group with a hindered hydroxyl group, or an aminophenyl group, such as, for example

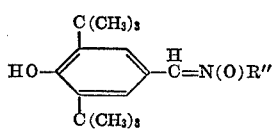

or

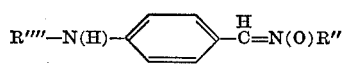

(wherein R'''' represents a hydrocarbyl group of up to 10 carbon atoms and preferably a lower alkyl group). Nitrones with an amino phenyl group may also serve as an antiozonant.

The invention also relates to the preparation of vulcanized products prepared by vulcanization of the polymers modified by reaction with a mononitrone as described hereinbefore. The term "vulcanization" includes not only vulcanization with the application of a sulphur-containing formulation, but also the reaction of the polar groups incorporated via the nitrone, such as carboxyl groups, sulpho groups or phosphono groups, with metal oxides, metal hydroxides or certain salts (as hereinbefore described) in the absence of sulphur, which reaction leads to the formation of ionomers or other cross-linked products.

Although the modification reaction according to the invention yields the best results if the reaction is performed prior to the addition of reinforcing fillers and one or more other ingredients of the vulcanization recipe, the nitrones may, if desired, also be allowed to react with the polymers in the presence of reinforcing fillers and in the presence or absence of one or more of the other ingredients, such as e.g., zinc oxide and stearic acid (but in the absence of sulphur and accelerators).

Example I

A number of experiments were performed to investigate the effect of the reaction of a number of nitrones with an isoprene polymer prepared with the aid of sec-butyllithium initiator.

The nitrones applied were:

Nitrone a:

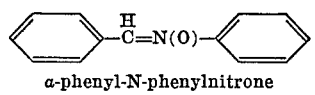

α-phenyl-N-phenylnitrone

Nitrone b:

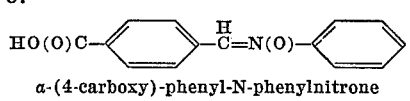

α-(4-carboxy)-phenyl-N-phenylnitrone

Nitrone c:

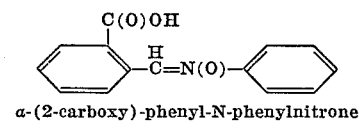

α-(2-carboxy)-phenyl-N-phenylnitrone

Nitrone d:

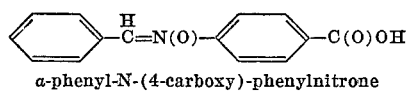

α-phenyl-N-(4-carboxy)-phenylnitrone

The isoprene polymer contained 0.15% w. of 2,6-ditert. butyl-4-methyl-phenyl as antioxidant and had an intrinsic viscosity (IV) in toluene at 25° C. of 7.0 dl./g. and a Hoekstra plasticity value of 71. The Hoekstra value was determined according to the method of E.W. Duck and J. A. Waterman, described in Rubber and Plastics Age 42 (1961) 1079–83, with the aid of an apparatus described in Proceedings Rubber Technology Conference, London 1938, p. 362.

The reactions with the nitrones were performed in the dry state in a Brabender Plastograph, the total mixing time being 5 minutes. The other reaction conditions are given in Table A.

After the reaction products thus obtained had been cooled down, their Hoekstra values were determined and compositions were prepared on a Schwabenthan mill at 60–70° C.; these compositions were formulated as follows (expressed in parts by weight):

| | |
|---|---:|
| Polymer | 100 |
| Sulphur | 2.25 |
| ZnO | 5 |
| Stearic acid | 3 |
| HAF carbon black | 50 |
| Flector H [1] | 1 |
| Santoflex IR [2] | 1 |
| Santocure [3] | 1.9 |

[1] Trade name for polymerized trimethyldihydroquinoline, obtained by reaction of aniline with acetone.
[2] Trade name for N-isopropyl-N-phenylparaphenylenediamine.
[3] Trade name for N-cyclohexyl-2-benzothiazolesulphene amide.

These compositions were allowed to stand overnight at room temperature, after which test plates of about 0.15 cm. thickness were prepared from them by pressing for 5 minutes at 80° C. These unvulcanized plates, too, were allowed to stand overnight at room temperature, after which their strength ("green strength") was determined by means of tensile tests. For this purpose strips were used which had been punched from the test plates with the aid of a 1-cm. wide die; they were tested according to method ASTM–D–412/69 intended for unvulcanized rubbers. The test results have been included in Table A. This table also shows the results of two blank experiments (experiments 1 and 2).

TABLE A

| Experiment number | Nitrone applied | | | Reaction temp., Brabender, °C. | Hoekstra plasticity | Color of reaction product | Tensile tests of unvulcanized composition | | | |
|---|---|---|---|---|---|---|---|---|---|---|
| | Designation | Melting point, °C. | Percent w. on polymer | | | | Yield stress, kg./cm.² | Modulus, 300%, kg./cm.² | Tensile strength, kg./cm.² | Strain at break, percent |
| 1 | | | | | 71 | Colorless | 3.0 | | 1.0 | 230 |
| 2 | | | | 155 | 35 | ....do....... | 3.8 | 2.9 | 2.7 | 1,070 |
| 3 | a | 109 | 0.50 | 110 | 62 | Light-yellow | (¹) | 7.0 | 18.9 | 940 |
| 4 | a | | 1.00 | 155 | 41 | ....do....... | (¹) | 10.6 | 17.6 | 540 |
| 5 | b | 225 | 0.50 | 155 | 50 | Colorless | 4.1 | 3.7 | 3.7 | 840 |
| 6 | b | | 1.00 | 155 | 48 | ....do....... | 4.6 | 4.3 | 3.8 | 740 |
| 7 | b | | 1.00 | 180 | 25 | Beige | 5.3 | 6.1 | 10.5 | 990 |
| 8 | c | 114 | 0.25 | 155 | 38 | ....do....... | 3.9 | 3.9 | 6.9 | 1,039 |
| 9 | c | | 0.50 | 155 | 48 | Light-yellow | (¹) | 5.5 | 17.2 | 930 |
| 10 | c | | 0.25 | 125 | 61 | ....do....... | 4.2 | 4.6 | 10.0 | 970 |
| 11 | c | | 0.50 | 125 | 68 | ....do....... | (¹) | 5.6 | 16.0 | 1,090 |
| 12 | c | | 0.50 | 110 | 62 | ....do....... | (¹) | 6.1 | 18.3 | 1,000 |
| 13 | d | 185 | 0.50 | 155 | 50 | ....do....... | 4.7 | 5.4 | 9.4 | 915 |
| 14 | d | | 1.00 | 125 | 63 | ....do....... | (¹) | 7.3 | 10.6 | 770 |
| 15 | d | | 0.50 | 125 | 63 | ....do....... | 5.0 | 5.3 | 6.7 | 910 |

¹ The stress-strain curve did not reveal any yielding.

The composition applied in experiment No. 11 was vulcanized for 18 minutes at 145° C. The vulcanizate displayed the following properties:

Modulus, 300%: 113 kg. cm.²  
Tensile strength: 254 kg. cm.²  
Strain at break: 542%  
Permanent set: 14%  
$\Bigg\}$ (ASTM-D 412/68).

Tear strength: 50 kg./cm.² _____ (ASTM-D 624, die C).

Example II

A number of experiments were performed in which the nitrone was prepared in situ by first mixing the isoprene polymer mentioned in Example I, in a Brabender Plastograph at 125° C. with an aldehyde and subsequently with phenylhydroxylamine. The total mixing time in the Brabender was 8 minutes. The type of the aldehyde and the other conditions, together with the results, are given in Table B. The resulting properties were determined on compositions formulated as described in Example I.

What is claimed is:

1. A process for the modification of elastomeric isoprene polymers into toluene soluble products which can be processed together with a filler to unvulcanized compositions having improved "green strength," which process comprises reacting said isoprene polymer with from about 0.1 to about 1.0% by weight on said polymer of a mononitrone at a temperature from about 60° to about 200° C. for a period from about 5 to about 30 minutes.

2. A process as in claim 1 wherein the mononitrone contains at least one organic group with an aromatic character selected from phenyl, thienyl, pyridyl and furyl groups.

3. A process as in claim 1 wherein the nitrone contains at least one organic group bearing at least one substituent group having an oxygen atom that is linked via a double bond to another atom selected from carbon, sulphur, phosphorus and nitrogen.

4. A process as in claim 3 wherein the nitrone organic

TABLE B

| Experiment number | Aldehyde applied | | Phenyl-hydroxyl amine, percent w. on polymer | Hoekstra plasticity | Appearance | Tensile tests of unvulcanized composition | | | |
|---|---|---|---|---|---|---|---|---|---|
| | Type | Percent w. on polymer | | | | Yield stress, kg./cm.² | Modulus, 300% kg./cm.² | Tensile strength, kg./cm.² | Strain at break, percent |
| 16 | Orthocarboxybenzaldehyde | 1.0 | 0.74 | 37 | Light-brown | 3.8 | 4.6 | 9.9 | 900 |
| 17 | Benzaldehyde | 1.0 | 0.90 | 60 | ....do....... | (¹) | 5.9 | 16.0 | 910 |
| 18 | Parahydroxybenzaldehyde | 1.0 | 0.78 | 58 | Ochre | 4.0 | 4.0 | 5.4 | 1,020 |
| 19 | 3.5-di-tert.butyl-4-hydroxy-benzaldehyde. | 1.0 | 0.41 | 51 | Beige | 3.8 | 4.2 | 9.6 | 1,030 |
| 20 | Parasulfamoylbenzaldehyde | 1.0 | 0.51 | 48 | Ochre | (¹) | 4.8 | 8.8 | 870 |
| 21 | Paramethylbenzaldehyde | 1.0 | 0.79 | 48 | ....do....... | (¹) | 4.9 | 12.8 | 940 |

¹ The stress-strain curve did not show any yielding.

Example III

A number of experiments were performed, employing the isoprene polymer mentioned in the previous examples. This time an additional quantity of 2,6-di-tert.butyl-4-methylphenol antioxidant (0.5% w. on polymer) was added to the polymer, and the reaction was performed at 110° C. for 5 minutes in a 7% w. solution of the polymer in toluene. After removal of the solvent by steam stripping and drying of the polymer, the resulting reaction product was formulated as shown in Example I, into compositions having the properties shown in Table C. The stress-strain characteristics were determined according to the procedure of Example I.

group is a hydrocarbyl group bearing at least one carboxyl group substituent.

5. A process as in claim 1 wherein the nitrone is an aldonitrone.

6. A process as in claim 1 wherein the nitrone has a melting point that is lower than the temperature at which the reaction of the polymer with the nitrone is effected.

7. A process as in claim 1 wherein the polymer is polyisoprene prepared with the aid of a lithium hydrocarbyl initiator.

8. A process as in claim 1 wherein the mononitrone has a polar substituent selected from carboxyl, sulpho and phosphono groups and the modified product is further re-

TABLE C

| Experiment No. | Nitrone applied | | Reaction product | | | Stress-strain characteristics of unvulcanized composition | | | |
|---|---|---|---|---|---|---|---|---|---|
| | Designation (see Example I) | Percent w. on polymer | Appearance | IV, in toluene 25° C., dl./g. | Gel content in pentane, percent w. | Yield stress, kg./cm.² | modulus, 300%, kg./cm.² | Tensile strength, kg./cm.² | Strain at break, percent |
| 22 | b | 1.0 | Pale yellow | 3.2 | 1 | 4.0 | 3.6 | 4.0 | 960 |
| 23 | c | 0.5 | ....do....... | 3.7 | 0 | 4.0 | 3.5 | 4.1 | 970 | acted with from about 0.1 to about 5 moles on the amount of nitrone applied in the modification step of at least one agent selected from oxides, hydroxides and salts of fatty acids containing 1 to 20 carbon atoms, of a divalent metal selected from Groups IIa and b and IVa and b of the Periodic System.

References Cited

UNITED STATES PATENTS

| | | | |
|---|---|---|---|
| 3,390,133 | 6/1968 | Breslow | 260—94.7 N X |
| 3,576,908 | 4/1971 | Brack | 260—94.7 N X |

FOREIGN PATENTS

| | | | |
|---|---|---|---|
| 1,146,469 | 3/1969 | Great Britain | 260—94.7 |

OTHER REFERENCES

Journ. of Applied Polymer Sci., vol. 15, pp. 117–128 (1971), Tada et al.

JOSEPH L. SCHOFER, Primary Examiner
W. F. HAMROCK, Assistant Examiner